United States Patent [19]
Ohta et al.

[11] Patent Number: 6,004,235
[45] Date of Patent: Dec. 21, 1999

[54] BELT AUTOTENSIONER

[75] Inventors: Hideyuki Ohta, Yao; Tetsuya Oda, Yamatotakada, both of Japan

[73] Assignee: Koyo Seiko Co., Ltd., Osaka, Japan

[21] Appl. No.: 08/997,562

[22] Filed: Dec. 23, 1997

[30] Foreign Application Priority Data

Jan. 31, 1997 [JP] Japan ................................. 9-018673
Jan. 31, 1997 [JP] Japan ................................. 9-018674

[51] Int. Cl.$^6$ .................. F16H 7/08; F16H 7/14; F16H 7/12
[52] U.S. Cl. .................. 474/109; 474/113; 474/133; 474/902
[58] Field of Search ............... 474/94, 101, 109, 474/111, 113–117, 133–138, 902

[56] References Cited

U.S. PATENT DOCUMENTS

| | | |
|---|---|---|
| 4,352,363 | 10/1982 | Hager . |
| 4,698,049 | 10/1987 | Bytzek et al. . |
| 5,405,296 | 4/1995 | Cerny et al. ............................. 474/135 |
| 5,407,397 | 4/1995 | Foley ....................................... 474/135 |
| 5,421,788 | 6/1995 | Toth ......................................... 474/135 |
| 5,449,328 | 9/1995 | Schmidt et al. . |
| 5,478,285 | 12/1995 | Bakker et al. ........................... 474/135 |
| 5,503,599 | 4/1996 | Brehler et al. ........................... 474/135 |
| 5,620,385 | 4/1997 | Cascionale et al. ..................... 474/135 |
| 5,647,813 | 7/1997 | Serkh ....................................... 474/135 |
| 5,702,314 | 12/1997 | Schmid ..................................... 474/135 |
| 5,772,549 | 6/1998 | Berndt et al. ............................. 474/135 |

FOREIGN PATENT DOCUMENTS

| | | |
|---|---|---|
| 4 224759A | 2/1994 | Germany . |
| 4 428560A | 2/1996 | Germany . |
| 2-253035 | 10/1990 | Japan . |

OTHER PUBLICATIONS

Patent Abstract of Japanese No. 06-145,649, published May 27, 1994.

Primary Examiner—Thomas R. Hannon
Assistant Examiner—Matthew A. Kaness
Attorney, Agent, or Firm—Birch, Stewart, Kolasch & Birch, LLP

[57] ABSTRACT

A belt autotensioner including: a support arm having one end supported and the other end biased in a predetermined direction; a tension pulley supported by the other end of the support arm; and a friction member held in sliding contact with the support arm for applying a rocking resistance to the support arm, and having a Rockwell hardness [$H_R R$] of 30 to 40 in at least a portion in sliding contact with the support arm.

8 Claims, 8 Drawing Sheets

F I G. 5
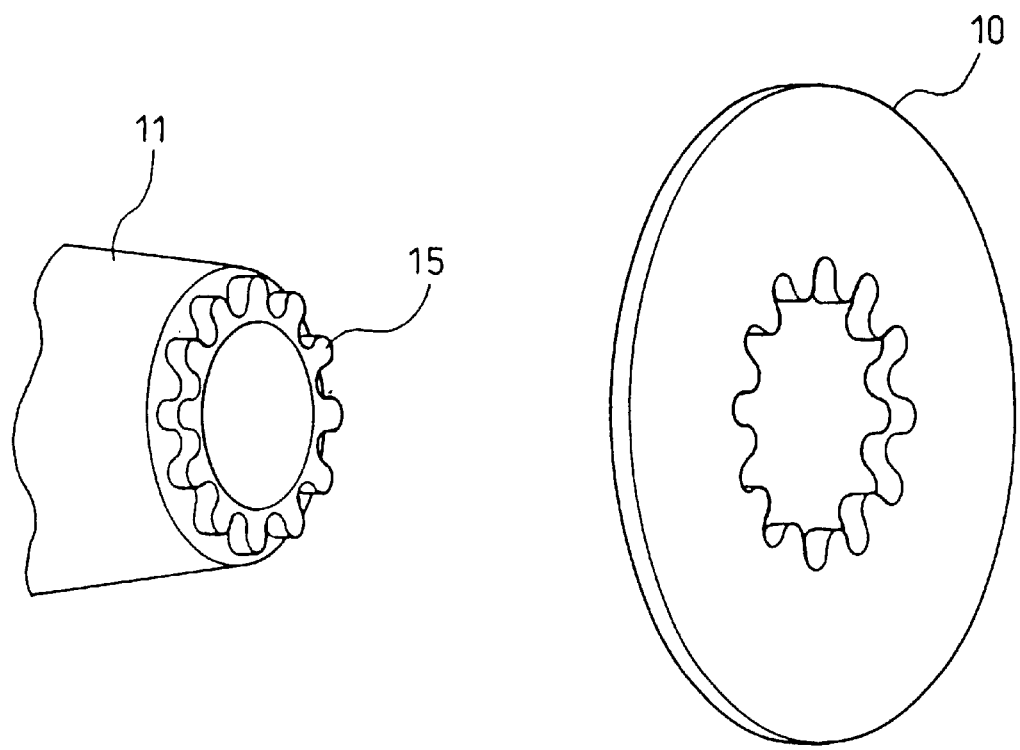

BELT AUTOTENSIONER

BACKGROUND OF THE INVENTION

1. Field of the Invention

The present invention relates to an autotensioner for keeping the tension of a belt of a belt drive mechanism automatically to a proper level.

2. Description of the Related Art

In the belt drive mechanism of the prior art in which the belt is made to run on a drive pulley and a driven pulley, there is used an autotensioner as means for applying a tension to the belt. This autotensioner generally includes a tension pulley for applying a tension to the belt; a support arm for supporting the tension pulley; a torsion coil spring for biasing the support arm in one direction; and a friction member for establishing a resistance (or sliding resistance) to the rocking motions of the support arm. In this autotensioner, the motions of the tension pulley are regulated, while being allowed according to the fluctuations in the tension of the belt, so that the support arm may be elastically biased in one rocking direction by the torsional restoring force of the coil spring and given a rocking resistance by the friction member.

In this autotensioner, as disclosed in Unexamined Published Japanese Patent Application No. 2-253035, the friction member is made of an annular plate for realizing the function of attenuating vibrations and impacts. The friction member is sandwiched between the front and end face of the boss or the component of the support arm and a guide member, as mounted on the front end of a rocking support pin for supporting the support arm, while employing them as its sliding contact partners. Moreover, the friction member is pressed between the sliding contacting partners by the extendible restoring force thereby imparting the rocking resistance to the support arm by its friction.

The friction member is usually made of a relatively hard material such as a material having a Rockwell hardness $[H_R R]$ of about 50 or more. The material for the friction member is prepared by adding glass fibers to the base of either a thermoplastic synthetic resin such as polyamide (PA), polyether ketone (PEEK) or polyether sulfone (PES), or a thermoset synthetic resin of phenol.

In the autotensioner described above, the friction member is made of a relatively hard material mainly with an object of suppressing an abrasion. When the sliding contact partners have a large manufacturing distortion, the friction member has a region, where it is out of contact with the partners, at the initial state of use. As the abrasion of the friction member proceeds according to the use so that the non-contact region is lessened, the friction coefficient of the friction member to the sliding contact partners seriously changes. This invites an instability in the vibration/impact attenuation characteristics of the friction member.

When the friction member is made of a relatively soft material, on the contrary, it can come into close contact with even the sliding contact partners having the manufacturing distortion. It is then expected that the change in the friction coefficient between the initial and advanced stages can be suppressed to a small value. However, the friction member has a short lifetime because of less caused by abrasion.

SUMMARY OF THE INVENTION

It is, therefore, a main object to provide an autotensioner which can stabilize the vibration/impact attenuation characteristics without deteriorating the wear resistance of the friction member.

The other objects, features and advantages of the invention will become apparent from the following description.

In order to achieve the above-specified object, according to the invention, there is provided an autotensioner comprising: a support arm having one end supported and the other end biased in a predetermined direction; a tension pulley supported by the other end of the support arm; and a friction member held in sliding contact with the support arm for applying a rocking resistance to the support arm, and having a Rockwell hardness $[H_R R]$ of 30 to 40 in at least its portion in sliding contact with the support arm.

Preferably, the friction member is prepared by adding a rubber component to a thermoset synthetic resin.

In the invention, the Rockwell hardness of the friction member is specified by taking the wear resistance and the softness into consideration. As a result, the friction member is liable to come into close contact with the sliding contact partners even at the initial use stage. Moreover, this contact state of the friction member with the sliding contact partners is not changed significantly over an extended period of use. As a result, the frictional coefficients at the initial and elapsed stages take similar values. Moreover, the abrasion of the friction member is retained at a level, as equivalent to that of the hard material of the prior art.

BRIEF DESCRIPTION OF THE DRAWINGS

These and other objects as as advantages of the invention will become clear by the following description of preferred embodiments of the with reference to the accompanying drawings, wherein:

FIG. 5 is a perspective view showing a coupling portion between a rocking support pin and a friction member guide of the embodiment;

DETAILED DESCRIPTION OF THE INVENTION

Figure 1:
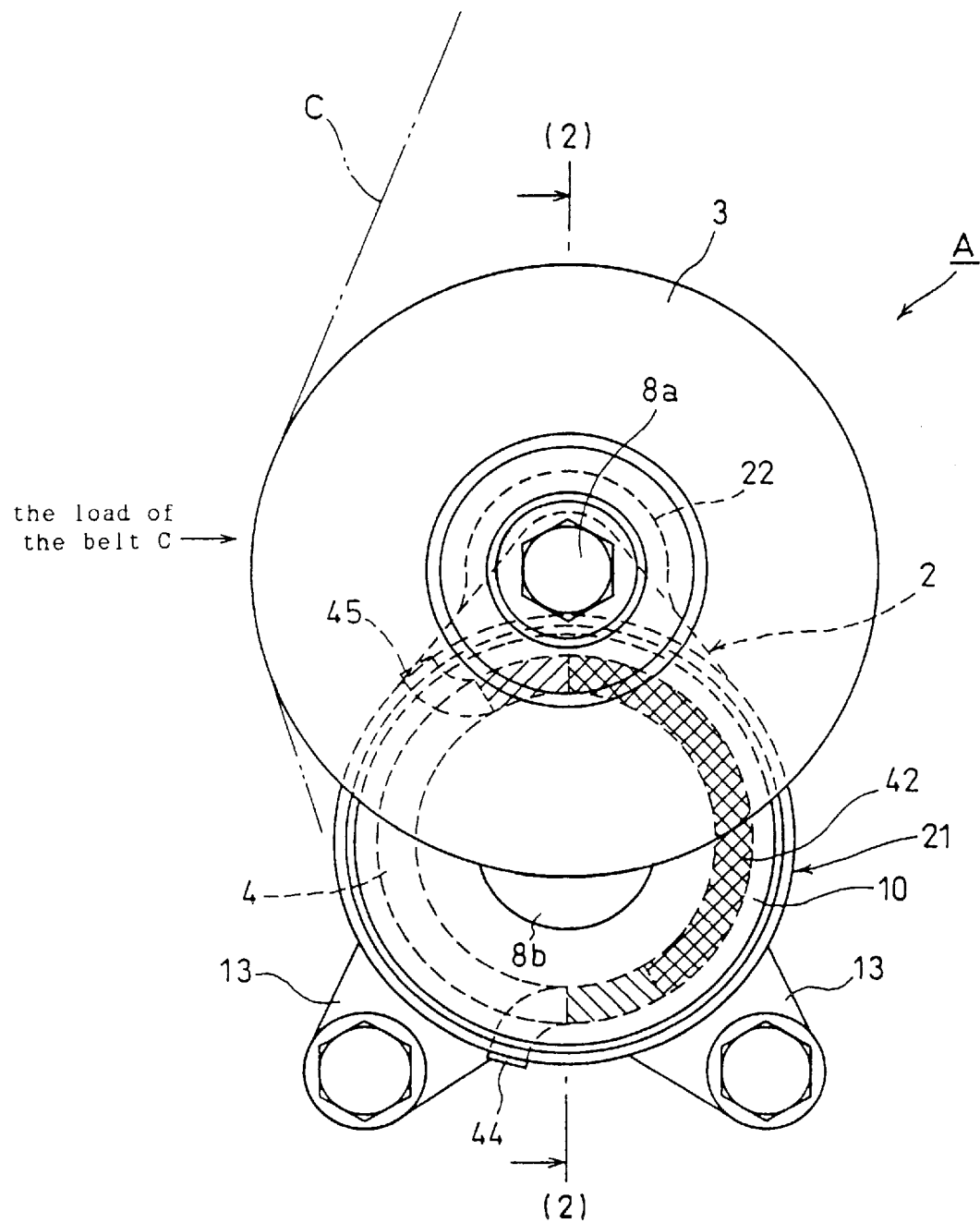
FIG. 1 is a top plan view of an autotensioner according to a preferred embodiment of the invention.
Figure 2:
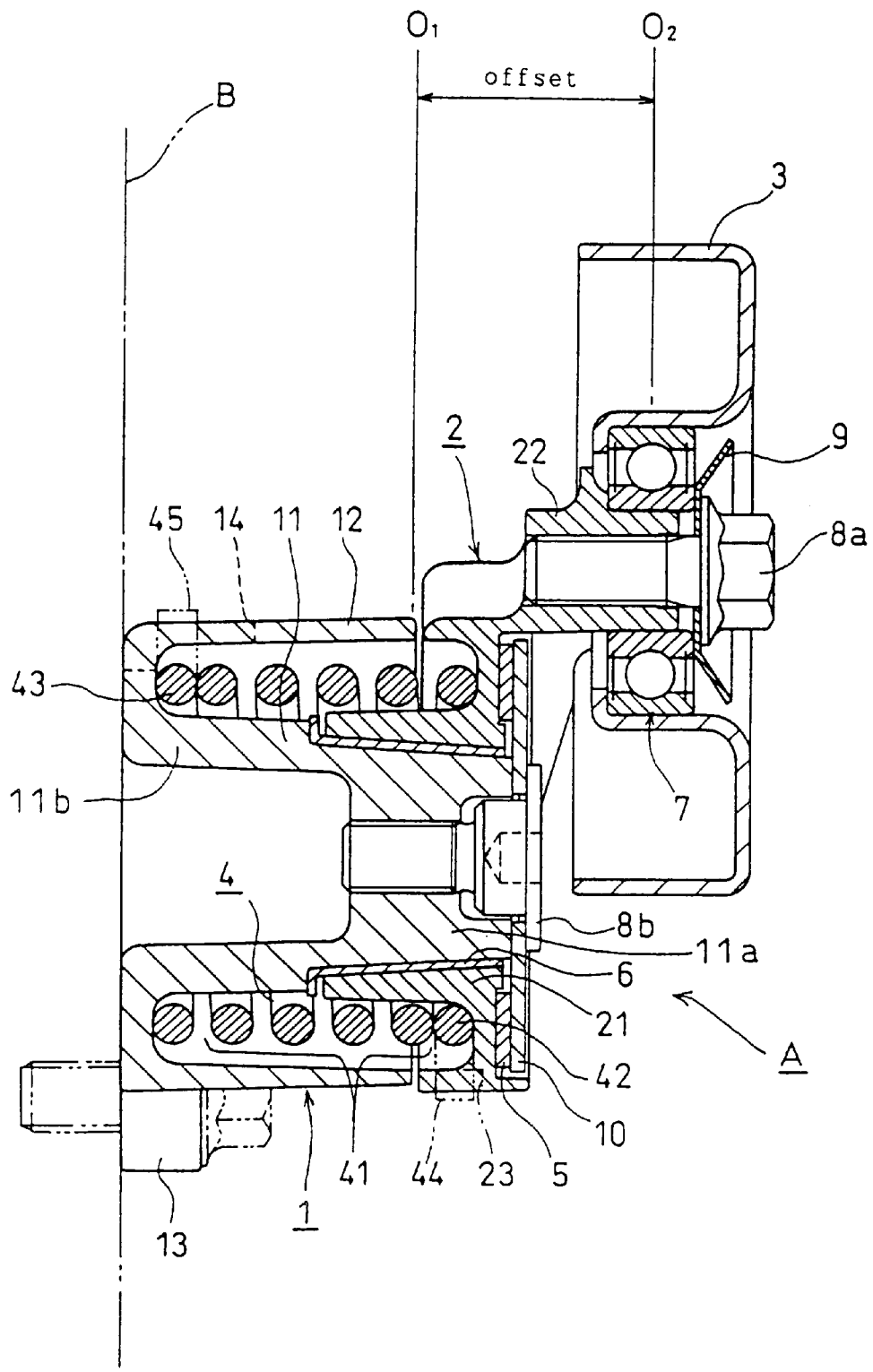
FIG. 2 is a section taken along line (2)—(2) of FIG. 1.

The invention will be described in detail in connection with its individual embodiments with reference to FIGS. 1 to 9.

In the Figures, reference letter A designates the entirety of the autotensioner; numeral 1 designates a rocking support pin; numeral 2 designates a support arm; numeral 3 designates a tension pulley; numeral 4 designates a torsion coil spring; and numeral 5 designates a friction member.

The autotensioner A in the shown embodiment is held in the state, in which the pulley 3 is positioned in front of the front end of the rocking support pin 1, that is, in which the axial center $O_2$ of the rotational support of the pulley 3 is offset with respect to the axial center $O_1$ of the rotational support of the support arm 2 in the rocking support pin 1.

The support pin 1 is fixed at a mount B on which the not-shown belt drive mechanism is mounted. The support pin 1 is equipped with a rocking fulcrum 11, a cover 12 and bolt mounting members 13. The fulcrum 11 is composed of a leading half 11a having a conical shape, and a base end half 11b having a cylindrical shape. The cover 12 is extended radially outwards from the base end of the rocking fulcrum 11 to enclose the outer circumference of the fulcrum 11. The bolt mounting members 13 are radially extended and formed at the outer circumference of the cover 12.

The support pin 1 is die-cast of aluminum. The conical portion of the fulcrum 11 of the support pin 1 is a taper of the mold but may be replaced by a cylindrical shape.

The support arm 2 is rotatably supported on the support pin 1. The arm 2 is equipped with a boss 21 and a tension pulley support 22. The boss 21 is fitted on the conical portion of the fulcrum 11 of the support pin 1 through a slide bearing 6 such as a metal bushing. The support 22 is extended from the boss 21 in the direction away from the boss 21. The slide bearing 6 provides the aforementioned rotational support.

The tension pulley 3 is made of a pressed member and is rotatably supported on the pulley support 22 of the arm 2 through a roller bearing 7. A belt C is made to run on the outer circumference of the tension pulley 3. The roller bearing 7 is press-fitted in the inner circumference of the pulley 3. This pulley 3 is prevented from coming out by a bolt 8a which is screwed into the front end of the support 22 of the arm 2. The bolt 8a fixes a bearing protection cover 9 for protecting the bearing 7 of the pulley 3 against moisture or a foreign substance. The bearing 7 also provides the aforementioned rotational support.

Figure 3:
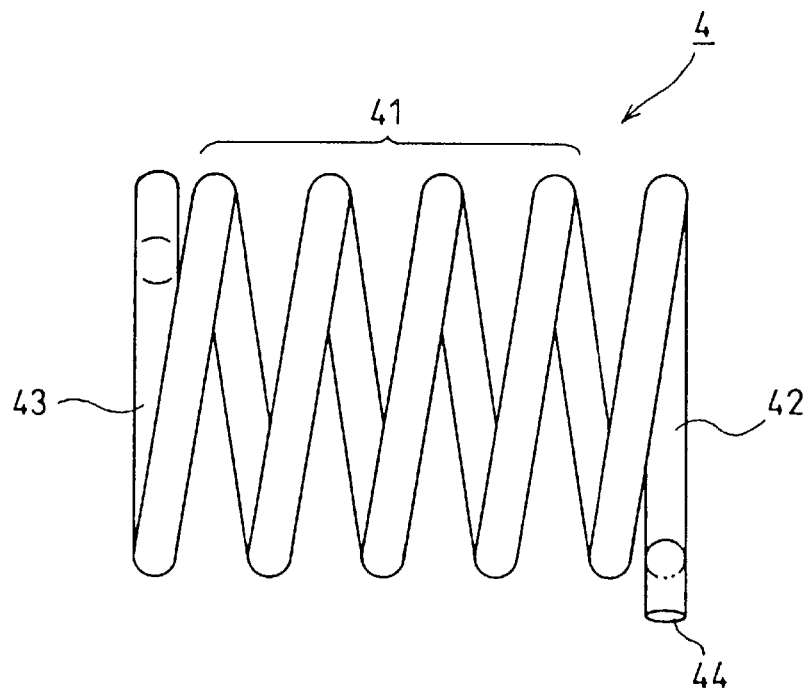
FIG. 3 is a side elevation of a torsion coil spring of the embodiment.
Figure 4:
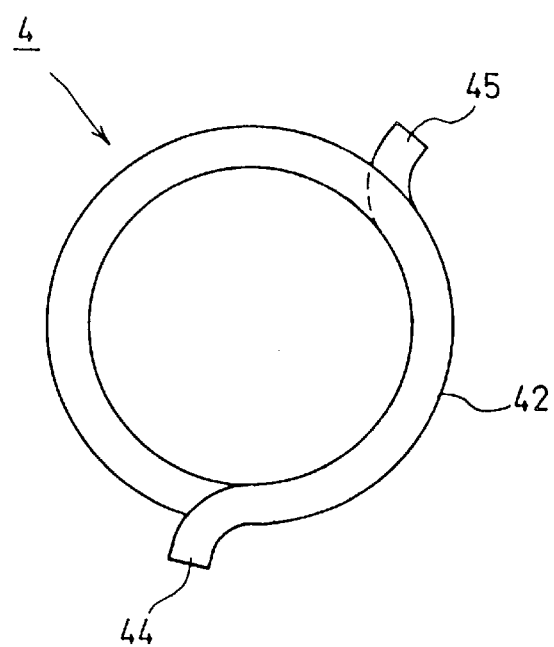
FIG. 4 is a top plan view of the torsion coil spring of the embodiment.

The coil spring 4 is arranged in a non-contact state and in a torsionally compressed state in the annular space between the outer circumferences of the fulcrum 11 of the rocking support pin 1 and the boss 21 of the arm 2 and the inner circumference of the cover 12 of the support pin 1. The coil spring 4 biases the arm 2 elastically in one rocking direction by its torsional restoring force. As shown in FIG. 3, on the other hand, the coil spring 4 is equipped with an intermediate effective coil portion 41 and end turns 42 and 43 positioned in the circumferential direction at the two ends of the coil portion 41. The end edges of the end turns 42 and 43 are bent radially outwards to form bent ends 44 and 45. These bent ends 44 and 45 are respectively retained in a slitted cut 14, which is formed in the bottom of the support pin 1, and in a slitted cut 23 which is formed in the boss 21 of the arm 2. The end turns 42 and 43 are provided at least a quarter or more or, preferably, one half of the turning circumference of the spring 4.

The end turn 42 at the boss 21 is assembled in the state in which it is positioned in the region opposed to the load of the belt C, as received by the pulley 3, as hatched rightwardly downward in FIG. 1. The end turn 43 at the rocking support pin 1 is assembled in the state in which most of it is positioned in the region opposed to the load of the belt C, as received by the pulley 3, as hatched leftwardly downward in FIG. 1. Both the two end turns 42 and 43 are positioned in the region opposed to the load of the belt C, as received by the pulley 3.

The friction member 5 is interposed between the support pin 1 for applying a rocking resistance to the arm 2 and the boss 21 of the arm 2. Here, the friction member 5 is sandwiched between the front end face of the boss 21 of the arm 2 and a friction member guide 10 and is so fixed on the front end of the support pin 1 as to confront the front end face by a bolt 8b, so that the bolt 21 is elastically biased toward the guide 10 by the extendible restoring force of the spring 4. The guide 10 is made of an annular plate and is undulated on its inner circumference, as shown in FIG. 5. The rocking fulcrum 11 of the rocking support pin 1 has such a protrusion at its front end face as is undulated in its outer circumference to be fitted in the inner circumference of the guide 10. As a result, the guide 10 is rotationally stopped by the fitting engagement between the inner circumference of the guide 10 and the protrusion 15 of the fulcrum 11.

Here will be described the actions of the autotensioner A thus far described.

When the tension of the belt C reduces, the tension pulley 3, as elastically biased by the torsional restoring force of the spring 4, moves to the left of FIG. 1 to keep the tension of the belt C constant. When the tension of the belt C increases, on the other hand, the pulley 3 moves to the right of FIG. 1 against the torsional restoring force of the coil spring 4 to keep the tension of the belt C constant. Here, the tension of the belt C is fluctuated due to a change in the temperature of the circumstance, in which the drive mechanism of the belt C is arranged, or due to a change in the length of the belt C.

Moreover, the vibration or impact is attenuated, if applied to the autotensioner A, because a rocking resistance is applied to the arm 2 by the friction member 5, so that the arm 2 is prevented from any unnecessary rocking. As a result, the position of the pulley 3 is not dislocated more than necessary by the vibration or impact, so that the tension of the belt C is not seriously fluctuated.

In this embodiment, the friction member 5 is made of a material having a Rockwell hardness [$H_R R$] of 30 to 40 so as to suppress the change in the friction coefficient of the friction member 5 in the aforementioned vibration/impact attenuations. This material is exemplified by dispersing and adding a rubber component into the base of a thermoset synthetic resin of phenol. When the friction member 5 to be used has a proper softness, it is elastically deformed to come into close contact in conformity with the shape of the guide 10 even if this guide 10 has a manufacturing distortion.

Even if the friction member 5 comes into concordance as its abrasion proceeds with the use, its contact state with the guide 10 is hardly changed. By using the friction member 5, not only the contact state of the friction member 5 with the guide 10, but also the friction coefficient can be unchanged between the initial and elapsed stages, so that the aforementioned vibration/impact attenuating characteristics are stabilized. Moreover, the abrasion of the friction member 5 can be made as high as that of the hard material of the prior art.

Specifically, the relations between the hardness of the friction member 5 and the change in the friction coefficient and the relations between the hardness of the friction member 5 and the abrasion loss have been individually examined, as will be described in the following. The examinations are made on the embodiments 1 to 3, the comparisons 1 to 3 and the prior art 1 to 4. The change in the friction coefficient indicates the change, as determined by $\mu 2/\mu 1$, in relation between the friction coefficient $\mu 1$ of the friction member 5 at the initial stage and the friction coefficient $\mu 2$ of the friction member 5 at the elapsed stage. Here, the friction coefficients $\mu 1$ and $\mu 2$ are calculated from the torques when the autotensioner A is rocked.

The embodiments 1 to 3 are prepared by adding the rubber component to the base of the thermoset synthetic resin of phenol. By having different compositions of the rubber component: the embodiment 1 is given a Rockwell hardness [$H_R R$] of "27.6"; the embodiment 2 is given "32.7"; and the embodiment 3 is given "35".

The comparisons 1 to 3 are made exclusively of one similar to the thermoset synthetic resin of phenol of the embodiments 1 to 3, but has no addition of the rubber component. By making different the additions of a reinforcing material, for example: the comparison is given a Rockwell hardness [$R_R R$] of "62", the comparison 2 is given "88"; and the comparison 3 is given "125".

The prior art 1 to 4 are prepared by adding glass fibers to the base of a thermoset synthetic resin. By making the added composition of the glass fibers different: the prior art 1 is given a Rockwell hardness [$H_R R$] of "47"; the prior art 2 is given "72"; the prior art 3 is given "107"; and the prior art is given "109".

Figure 6:
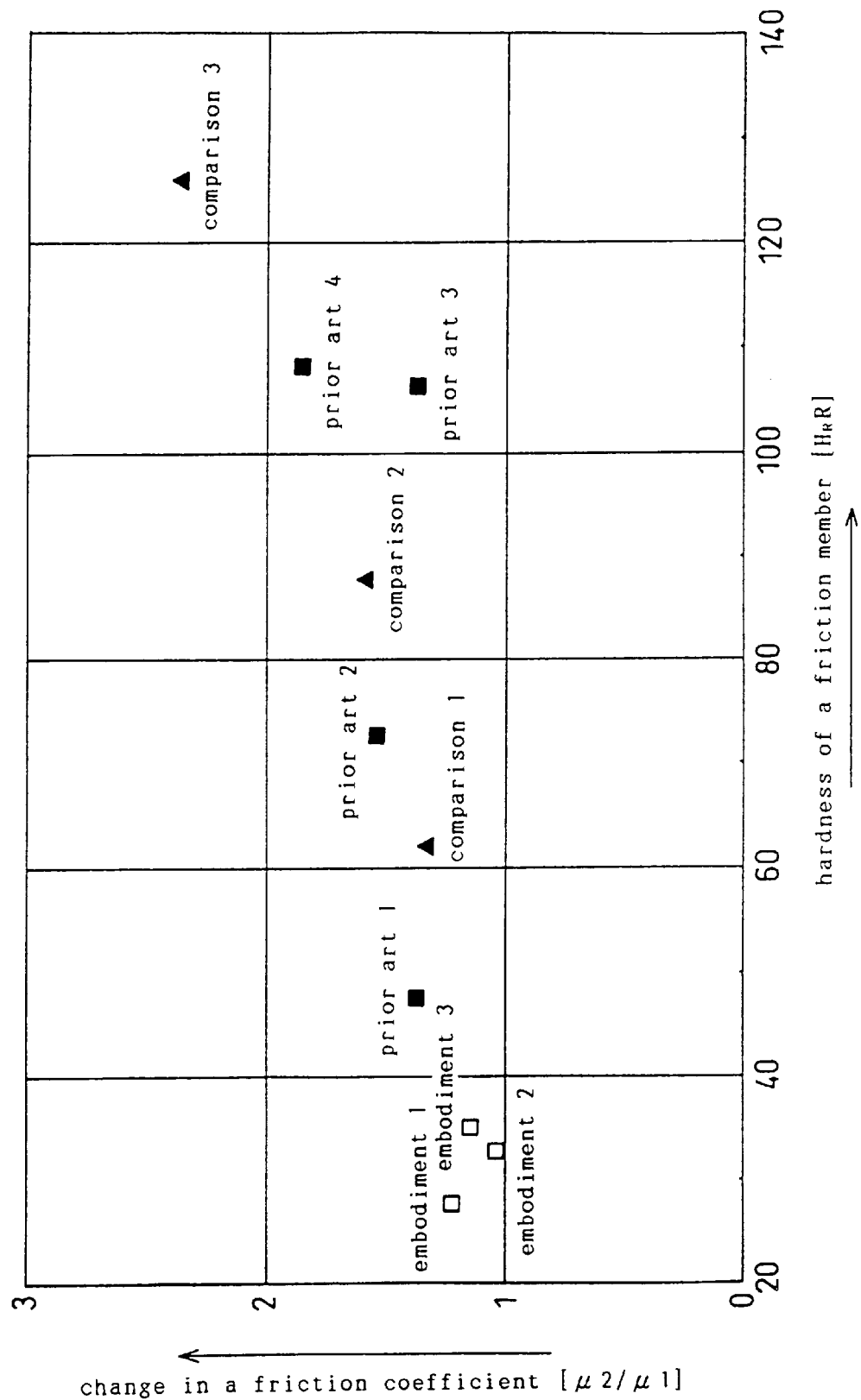
FIG. 6 is a diagram plotting relations between the hardness of a friction member and the change in a friction coefficient of the embodiment.
Figure 7:
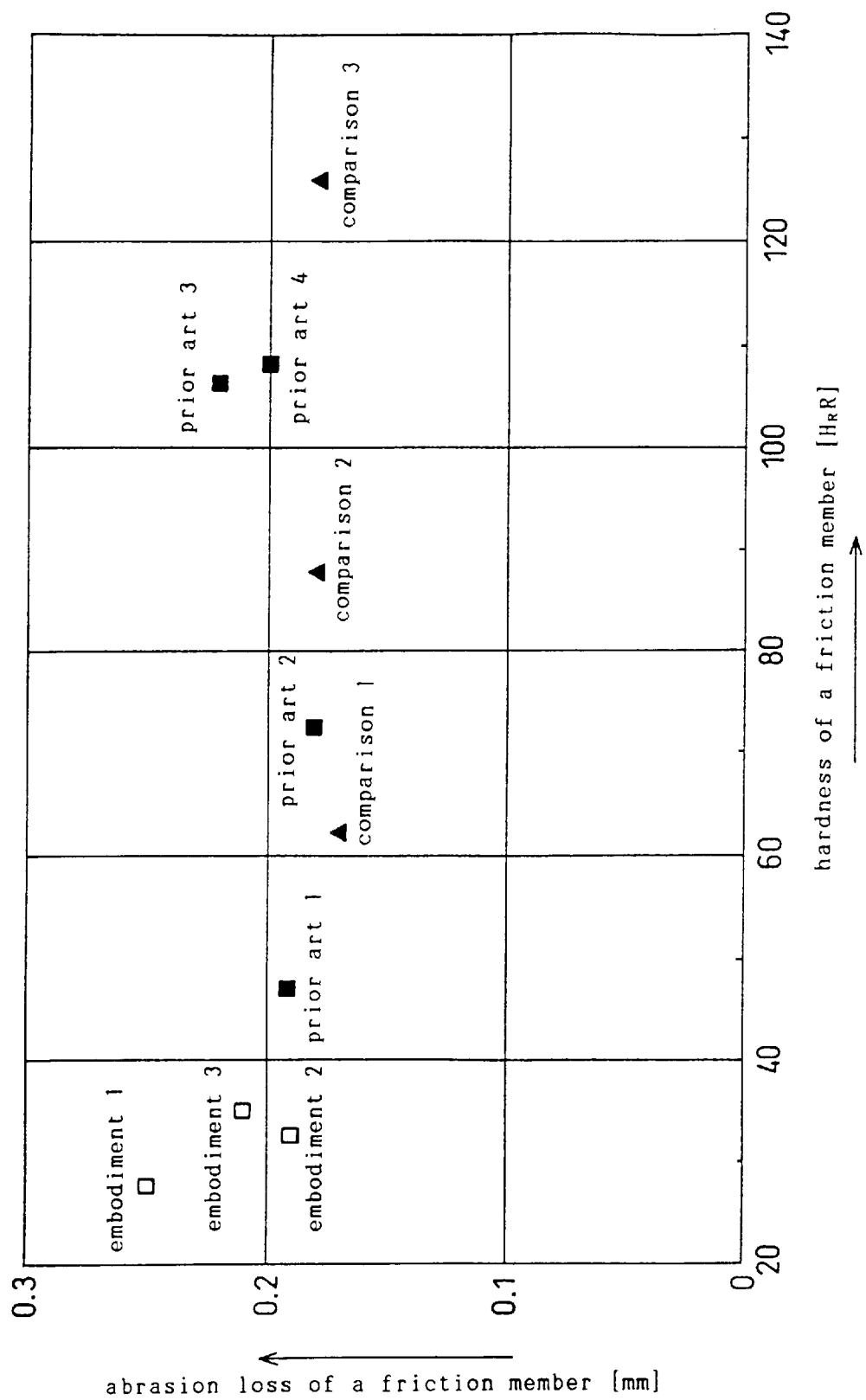
FIG. 7 is a diagram plotting relations between the hardness of a friction member and an abrasion loss of the embodiment.

As a result, the change in the friction coefficient is smaller in the embodiments 1 to 3 than in the comparisons 1 to 3 and in the prior arts 1 to 4, as shown in FIG. 6. On the other hand, the abrasion loss takes substantially similar levels for all except the embodiment 1, as shown in FIG. 7.

These results are synthesized to decide that the embodiments 2 and 3 are the most desirable, and the Rockwell hardness [$H_R R$] is defined within a range of 30 to 40 on the basis of the embodiments 2 and 3.

Here, the autotensioner A in the aforementioned embodiment is held in the state, in which the pulley 3 is positioned in front of the front end of the rocking support pin 1, that is, in which the axial center $O_2$ of the rotational support of the pulley 3 is offset with respect to the axial center $O_1$ of the rotational support of the arm 2 in the rocking support pin 1. With this structure, the load of the belt C to act on the pulley 3, acts as the moment load for the pulley 3 so that an excessive offset load acts on the friction member 5 or the slide bearing 6 to cause an offset abrasion. Taking this into consideration, the end turns 42 and 43 are positioned in the circumferential direction at the two ends of the coil spring 4 such that one end turn 42 and the other end turn 43 are held in abutment against the seat of the rocking support pin 1 and the seat of the boss 21 of the arm 2, respectively, over a wide range (i.e., about one half of the turning circumference of the coil spring 4). These abutting regions are assigned to the region opposed to the acting direction of the load of the belt C, as received by the pulley 3, as hatched rightwardly and leftwardly downward of FIG. 1, thereby to disperse the aforementioned moment load. By dispersing the moment load by the coil spring 4, not an excessive offset load, but an entirely equal load can be applied to the friction member 5 and the slide bearing 6 so that the friction member 5 and the slide bearing 6 are substantially equally abraded as time elapses.

The invention should not be limited to the foregoing embodiment but can conceive various applications and modifications.

Figure 8:
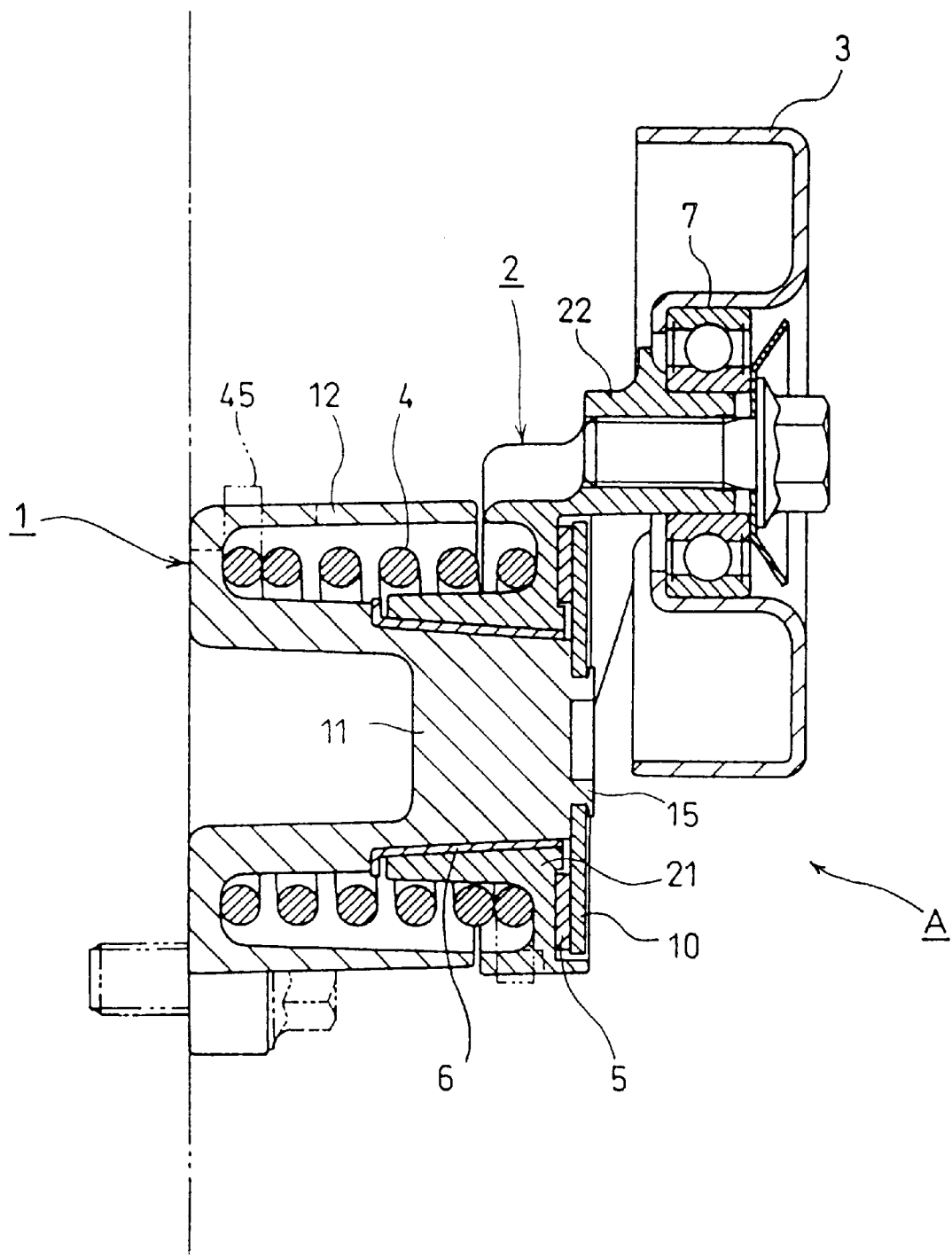
FIG. 8 corresponds to FIG. 2 but shows an autotensioner according to another embodiment of the invention.

(1) In the foregoing embodiment, the guide 10 is fixed on the rocking support pin 1 by the bolt 8b. As shown in FIG. 8, however, the guide may be fixed by additionally fastening to deform the protrusion 15 of the rocking fulcrum 11 of the rocking support pin 1. In this modification, the bolt 8b can be eliminated to make a contribution to a reduction in the cost by reducing the number of parts and by improving the assemblability.

Figure 9:
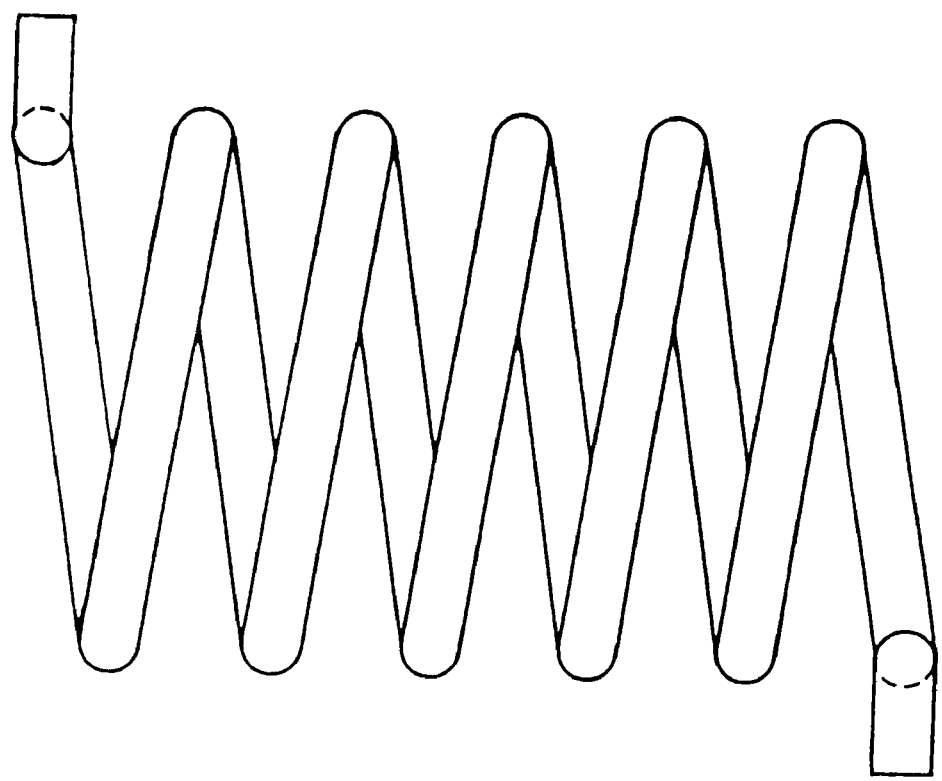
FIG. 9 is a side elevation showing a modification of the torsion coil spring.

(2) The foregoing embodiment is exemplified by the coil spring 4 which is equipped at it two ends with the end turns 42 and 43 positioned in the circumferential direction. As shown in FIG. 9, however, the invention can also be applied to the modification using the general coil spring 4 which is not equipped at its two ends with the end turns 42 and 43 positioned in the circumferential direction.

(3) The foregoing embodiment is exemplified by the autotensioner A having the structure, in which the pulley 3 is positioned in front of the front end of the rocking support pin 1, that is, in which the axial center $O_2$ of the rotational support of the pulley 3 is offset with respect to the axial center $O_1$ of the rotational support of the arm 2 in the rocking support pin 1. However, the invention can also be applied to the autotensioner having the structure, in which the axial center $O_2$ of the rotational support of the pulley 3 is aligned with the axial center $O_1$ of the rotational support of the arm 2 in the support pin 1. In this modification, the coil spring 4, as exemplified in the foregoing embodiment, need not be employed because the moment load is reluctant to occur.

Here, the shown autotensioner A is constructed to have the structure, in which the pulley 3 is positioned in front of the front end of the rocking support pin 1, that is, in which the axial center $O_2$ of the rotational support of the pulley 3 is offset with respect to the axial center $O_1$ of the rotational support of the arm 2 in the rocking support pin 1. As a result, the load of the belt C to act on the pulley 3 acts as the moment load to incline the pulley 3.

In the embodiment of the invention, on the contrary, the end turns 42 and 43 are positioned in the circumferential direction at the two ends of the coil spring 4 such that one end turn 42 and the other end turn 43 are held in abutment against the seat of the rocking support pin 1 and the seat of the boss 21 of the arm 2, respectively, over a wide range (i.e., about one half of the turning circumference of the coil spring 4). These abutting regions are assigned to the region opposed to the acting direction of the load of the belt C, as received by the pulley 3, as hatched rightwardly and leftwardly downward of FIG. 1, thereby to disperse the aforementioned moment load.

Thus, the moment load acts not as the excessive offset load upon the friction member 5 and the slide bearing 6 but as the entirely equal load so that the friction member 5 and the slide bearing 6 are substantially equally abraded as the time elapses. As a result, the friction member 5 and the slide bearing 6 will not cause the inclination of the pulley 3, even if abraded, so that the belt C to run on the belt C can be reliably prevented from coming out. This makes it unnecessary to employ an expensive material having an excellent wear resistance for the friction member 5 and the slide bearing 6.

Here, the invention should not be limited to the aforementioned embodiments but can conceive various applications and modifications.

(1) In the foregoing embodiment, the guide 10 is fixed on the rocking support pin 1 by the bolt 8b. In another embodiment, as shown in FIG. 8, the guide may be fixed by additionally fastening to deform the protrusion 15 of the rocking fulcrum 11 of the rocking support pin 1. In this modification, the bolt 8b can be eliminated to make a contribution to a reduction in the cost by reducing the number of parts and by improving the assemblability.

(2) In the foregoing embodiment, the coil spring 4 is equipped with the end turns 42 and 43 at its two ends. However, the structure having the end turn only at one end is contained by the invention. In this modification, the end turn at one end is preferably assembled such that it is positioned in the region (i.e., the region of the righthand half circumference of FIG. 1) opposed in the direction of the action of the load of the belt C, as received by the pulley 3.

While there has been described what is at present considered to e preferred embodiments of this invention, it will be understood that various modifications may be made therein, and it is intended to cover in the appended claims all such modifications as fall within the true spirit and scope of the invention.

What is claimed is:

1. A belt autotensioner comprising:

a support arm having one end supported and another end biased in a predetermined direction;

a tension pulley supported by said another end of said support arm; and a friction member held in sliding contact with said support arm for applying a rocking resistance to said support arm, and having a Rockwell hardness [$H_R R$] of 30 to 40 in at least a portion in sliding contact with said support arm, wherein said friction member is made of a thermostat resin material having a base with a rubber component.

2. A belt autotensioner according to claim 1, wherein said thermoset resin is a phenol group.

3. A belt autotensioner comprising:

a support arm having one end supported and another end biased in a predetermined direction;

a tension pulley supported by said another end of said support arm; and a friction member held in sliding contact with said support arm for applying a rocking resistance to said support arm, and having a Rockwell hardness [$H_R R$] of 30 to 40, wherein said friction member is made of a thermostat resin material having a base with a rubber component.

4. A belt autotensioner comprising:

a support pin;

a support arm having one end supported by said support pin and another end biased in a predetermined direction;

a tension pulley supported by said another end of said support arm; and a friction member positioned between said support arm and said support pin for applying a rocking resistance to said support arm, and having a Rockwell hardness [$H_R R$] of 30 to 40, wherein said friction member is made of a thermostat resin material having a base with a rubber component.

5. A belt autotensioner comprising:

a support pin;

a support arm having one end having a boss supported by said support pin, and another end biased in a predetermined direction;

a tension pulley rotatably supported by said another end of said support arm such that it is positioned in front of the front end of said support pin; and a friction member positioned between said support pin and said support arm for applying a frictional resistance to said support pin and said support arm, and having a Rockwell hardness [$H_R R$] of 30 to 40, wherein said friction member is made of a thermostat resin material having a base with a rubber component.

6. A belt autotensioner according to claim 5, further comprising:

a torsion coil spring mounted on the outer circumferences of said support pin and the boss of said support arm for biasing said support arm in said predetermined direction.

7. A belt autotensioner according to claim 6, wherein said torsion coil spring has an end turn positioned in the circumferential direction, on at least its one end.

8. A belt autotensioner according to claim 6, wherein said torsion coil spring has two end turns positioned in the circumferential direction on two ends of said torsion coil.

* * * * *